(12) United States Patent
Haubner et al.

(10) Patent No.: US 7,361,793 B2
(45) Date of Patent: Apr. 22, 2008

(54) METHOD FOR PRODUCING TETRAHYDROFURAN COPOLYMERS

(75) Inventors: Martin Haubner, Eppelheim (DE); Rolf Pinkos, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 23 days.

(21) Appl. No.: 10/551,137

(22) PCT Filed: Mar. 30, 2004

(86) PCT No.: PCT/EP2004/003336

§ 371 (c)(1), (2), (4) Date: Sep. 29, 2005

(87) PCT Pub. No.: WO2004/087786

PCT Pub. Date: Oct. 14, 2004

(65) Prior Publication Data

US 2006/0258837 A1    Nov. 16, 2006

(30) Foreign Application Priority Data

Apr. 1, 2003    (DE) .............................. 103 14 648

(51) Int. Cl.
*C07C 43/00* (2006.01)

(52) U.S. Cl. .................. 568/624; 568/619; 568/620

(58) Field of Classification Search ................. 568/624, 568/619, 620

See application file for complete search history.

(56) References Cited

FOREIGN PATENT DOCUMENTS

| EP | 0126471 | 11/1984 |
|---|---|---|
| EP | 0158229 | 10/1985 |
| EP | 0181621 | 5/1986 |
| EP | 1004610 | 5/2000 |
| EP | 1361243 A1 * | 11/2003 |

OTHER PUBLICATIONS

F. Ehrenberger, Qnatitative Organische Elementaranalyse, 1991, Kap. 37, p. 382-384.
Z. Chemie, 17. (1977), pp. 353-357.
Z. Chemie 19 (1979) pp. 308-309.
International Search Report.

* cited by examiner

*Primary Examiner*—Elvis O. Price
*Assistant Examiner*—Katakam Sudhakar
(74) *Attorney, Agent, or Firm*—Connolly Bove Lodge and Hutz

(57) ABSTRACT

The present invention relates to a process for the single-stage preparation of polyoxyalkylene glycols by copolymerization of THF and alpha, omega-diols in the presence of a heteropolyacid, wherein the content of organically bound nitrogen in the alpha, omega-diol is less than 15 ppm.

16 Claims, No Drawings

METHOD FOR PRODUCING TETRAHYDROFURAN COPOLYMERS

This application claims priority from PCT/EP2004/003336 filed Mar. 30, 2004 and German Application 10314648.2 filed Apr. 1, 2003, the disclosures of each application are incorporated herein by reference.

The present invention relates to a novel process for preparing polyoxyalkylene glycols (polyalkylene ether glycols) by copolymerization of tetrahydrofuran, hereinafter referred to as "THF" for short, with alpha, omega-diols in the presence of heteropolyacids, in which pretreated alpha, omega-diols are used.

Polyoxyalkylene glycols are important starting materials for the production of elastic fibers, elastic materials of construction and coatings. They can be prepared, inter alia, by polymerization of THF or by copolymerization of THF with alpha, omega-diols such as neopentyl glycol, hereinafter referred to as "NPG" for short, in the presence of cationic catalysts. The use of heteropolyacids as catalysts is known from, for example, EP-A 126 471. This process makes it possible to obtain polyalkylene ether glycols in a single stage, while in other processes the esters of the polyoxyalkylene glycols are obtained first and have to be hydrolyzed to the polyoxyalkylene glycols before use in the field of polymers.

Heteropolyacids are for this purpose used in commercially available form, either dried and having a water content of from 1 to 10 mol of water per mole of heteropolyacid or undried and having a water content of from 10 to 40 mol of water per mole of heteropolyacid. The rapid deactivation of the heteropolyacid catalyst has been found to be particularly disadvantageous, especially in continuous copolymerizations and processes in which catalyst is reused, since it leads to decreasing polymerization conversions.

It is an object of the present invention to provide a simple and inexpensive process for preparing THF copolymers with alpha, omega-diols which is suitable for preparing THF copolymers with alpha, omega-diols at constant copolymerization conversions even when the heteropolyacid catalyst is reused.

We have found that this object is achieved by a process for the single-stage preparation of polyoxyalkylene glycols by copolymerization of THF and alpha, omega-diols in the presence of a heteropolyacid, wherein the content of organically bound nitrogen in the alpha, omega-diol used is less than 15 ppm, preferably 10 ppm, particularly preferably less than 5 ppm.

For the purposes of the present patent application, organically bound nitrogen is, in particular, the nitrogen of amines or organic ammonium compounds. It is determined by a chemoluminescence determination known from the literature, for example from F. Ehrenberger, Quantitative organische Elementaranalyse, Verlag Chemie, 1991, Chapter 37, pp. 382-384.

As alpha, omega-diols, use is made of commercially available $C_2$-$C_{10}$-alkanediols with the exception of 1,4-butanediol, e.g. ethylene glycol, propylene glycol, 1,3-propanediol, 1,3-butanediol, 2-methylbutanediol, 1,5-pentanediol, 1,6-hexanediol, neopentyl glycol, 3-methyl-1,5-pentanediol, 1,8-octanediol, 1,10-decanediol, diethylene glycol, triethylene glycol, low molecular weight THF copolymers with the $C_2$-$C_{10}$-alkanediols mentioned here having a mean molecular weight of from 200 to 600 dalton or mixtures thereof. Comonomers used are preferably low molecular weight THF copolymers having a mean molecular weight of from 200 to 600 dalton and neopentyl glycol, particularly preferably neopentyl glycol. 1,4-Butanediol is not a comonomer for the purposes of the present invention, since it leads to the homopolymer polytetrahydrofuran and does not give a copolymer.

The commercially available technical-grade alpha, omega-diols are treated by methods known per se to reduce the total proportion of organically bound nitrogen to below 10 ppm.

One possible way of purifying solid technical-grade alpha, omega-diols for use in the process of the present invention is recrystallization of the alpha, omega-diol from organic solvents.

Suitable organic solvents include $C_1$-$C_{10}$-diols such as methanol, ethanol, propanol or isopropanol, $C_1$-$C_{10}$-ethers such as tetrahydrofuran, diethyl ether, butyl methyl ether, and halogenated solvents such as chloroform or dichloromethane and mixtures thereof. Preference is given to using $C_1$-$C_{10}$-alcohols, particularly preferably methanol.

On a production scale, another possibility is the known layer or suspension crystallization method in which purification is achieved by crystallization from the melt and impurities remain in the melt.

A further method of purifying the alpha, omega-diols used according to the present invention is solvent extraction of a saturated, aqueous, alcoholic or tetrahydrofuran-containing solution of the alpha, omega-diol by means of saturated or unsaturated aliphatic, cycloaliphatic or olefinic $C_4$-$C_{15}$-hydrocarbons or $C_4$-$C_{15}$-ethers. However, it is also possible to use hydrocarbons containing halogen atoms such as chlorine. Mixtures of the abovementioned classes of solvent which have a proportion of at least 50% by weight of the hydrocarbon or ether are also suitable for the extraction.

On a production scale, liquid-liquid extraction can be carried out in a customary manner in one or more stages, generally up to 5 stages. Suitable apparatuses and procedures are known to those skilled in the art and are described, for example, in "Ullmanns Encyclopedia of Industrial Chemistry, 6th Edition, Electronic Release". Batchwise extractions can, for example, be carried out in a stirred vessel. Examples of continuous extraction are the use of sieve tray columns, stirred columns and extraction batteries, e.g. mixer-settlers. Membrane extractors, e.g. hollow fiber modules, can also be employed.

Furthermore, all known inorganic and organic ion exchangers as are known, for example, from Ullmann's Encyclopedia of Industrial Chemistry, 6th Edition, electronic release, 2000, can be used for removing the organically bound nitrogen from the alpha, omega-diols. Further suitable acid ion exchangers, also referred to as cation exchangers, are strong acid ion exchangers which contain sulfonic acid groups bound to an organic polymeric framework via benzene groups and are marketed, for example, in the form of the commercial products Amberlite® Ir 120, Amberjet® 1200 H and Duolite® C20 from Rohm & Haas, Darmstadt, Dowex® HCR from Dow Chemical, Midland, Mich., USA, Lewatit® K2621 and Lewatit® S100 from Bayer AG, Leverkusen, in all possible forms, for example as granules or as gel. Weak acid ion exchangers, generally polyacrylates which are marketed, for example, in the form of the commercial products Amberlite® IRC 76 and Duolite® C433 from Rohm & Haas, Darmstadt, are also suitable. Further suitable ion exchangers are clay minerals and zeolites in the H form. When the copolymerization is carried out continuously, the alpha, omega-diol can be conveyed via a prereactor charged with ion exchanger into the polymerization reactor. It is advantageous for a mixture of the alpha, omega-diol with THF and, if desired, a hydrocarbon and water, i.e. the reaction medium of the polymerization, to be passed over the ion exchanger.

Among the purification methods suitable for removing the organically bound nitrogen from the alpha, omega-diols used according to the present invention down to less than 5 ppm, preference is given to treatment with ion exchangers.

According to the present invention, from 1 to 60% by weight of the alpha, omega-diol, based on the tetrahydrofuran used, preferably from 2 to 40% by weight, particularly preferably from 3 to 20% by weight, is used in the copolymerization.

Tetrahydrofuran is used in an amount of from 40 to 99% by weight, based on the total amount of THF and alpha, omega-diol, preferably in an amount of from 60 to 98% by weight, particularly preferably from 80 to 97% by weight, in the copolymerization.

The copolymerization of THF with alpha, omega-diols in the presence of heteropolyacids as catalyst is carried out in a manner known per se, as is described, for example, in EP-A 126 471.

The copolymerization of the present invention is preferably carried out in the presence of a hydrocarbon. A mixture of water and this hydrocarbon is distilled off from the copolymerization solution. For the purposes of the present patent application, the term "mixture" encompasses both customary nonazeotropic mixtures and hydrocarbon-water azeotropes. This mode of operation is described in the German patent application No. 102 399 47.6 of BASF Aktiengesellschaft dated Aug. 30, 2002, and entitled "Preparation of tetrahydrofuran copolymers", which is hereby expressly incorporated by reference.

The hydrocarbons used should be suitable for forming an azeotrope with water. Hydrocarbons used are, for example, aliphatic or cycloaliphatic hydrocarbons having from 4 to 12 carbon atoms or aromatic hydrocarbons having from 6 to 10 carbon atoms or mixtures thereof. Specific mention may be made of, for example, pentane, hexane, heptane, octane, decane, cyclopentane, cyclohexane, benzene, toluene, xylene, or naphthalene, among which pentane, cyclopentane and octane are preferred and pentane is particularly preferred.

The hydrocarbons are added to the fresh feed to the copolymerization in an amount of from $1 \times 10^{-4}$% by weight (corresponding to 1 ppm) to 30% by weight, based on the fresh feed comprising alpha, omega-diol and THF, preferably from 1 ppm to 16% by weight, particularly preferably from 1 to 10% by weight. However, it is also possible to feed the hydrocarbon into the top of the distillation column for separating off the mixture of hydrocarbon and water. The molecular weight can be adjusted via the total amount of water which is removed from the copolymerization. In general, 1 mol of heteropolyacid binds from 10 to 40 molecules of water by coordination. The heteropolyacids used as catalysts should contain from about 1 to 10 molecules of water per molecule of heteropolyacid. In addition, water is liberated by the copolymerization with the alpha, omega-diols used as comonomer. The higher the water content of the copolymerization solution, the lower the molecular weight of the copolymer obtained.

For the purposes of the present patent application, the term "mean molecular weight" or "mean molar mass" refers to the number average Mn of the molecular weight of the polymer molecules present in the polymer formed.

Heteropolyacids which are used according to the present invention are inorganic polyacids which, in contrast to isopolyacids, have at least two different central atoms. Heteropolyacids are formed from weak polybasic oxo acids of a metal, e.g. chromium, molybdenum, vanadium or tungsten, and a non metal, e.g. arsenic, iodine, phosphorus, selenium, silicon, boron or tellurium, as partial mixed anhydrides. Examples which may be mentioned are dodecatungstophosphoric acid $H_3(PW_{12}O_{40})$ and decamolybdophosphoric acid $H_3(PMo_{12}O_{40})$. The heteropolyacids can also contain actinides or lanthanides as second central atom (cf. Z. Chemie 17 (1977), pages 353 to 357, and 19 (1979), 308). The heteropolyacids can generally be represented by the formula $H_{8-n}(Y''M_{19}O_{40})$, where n=valence of the element Y (e.g. boron, silicon, zinc) (cf. Heteropoly-und Isopolyoxometalates, Berlin; Springer 1983). In the process of the present invention, phosphotungstic acid, phosphomolybdic acid, silicomolybdic acid and silicotungstic acid are particularly useful as catalysts.

The heteropolyacids used as catalysts can be used either in dried form (from 1 to 10 mol of water/mol of heteropolyacid) or undried form (from 10 to 40 mol of water/mol of heteropolyacid) in the copolymerization.

The water present in the copolymerization reactor, of which part is water of crystallization from the heteropolyacid and part is water formed during the reaction, is removed directly from the copolymerization reaction, i.e. from the copolymerization reactor without intermediate work-up steps such as phase separation, as a mixture of the hydrocarbon added with the fresh feed with water at from 40 to 120° C., particularly preferably from 50 to 70° C., and a pressure of from 150 mbar to 2 bar, preferably 230 mbar, with the aid of customary distillation apparatus.

The vapor formed is preferably condensed in a surface condenser; however, quench condensers and spray condensers are also possible. The condensate obtained is passed to solvent work-up for removal of the water from the system. It is particularly advantageous to recirculate part of the condensate to the reactor, i.e. to remove the heat of reaction by means of evaporative cooling. To achieve the highest possible water contents in the condensate to be taken off, a multistage countercurrent rectification column supplied with the return condensate as runback can be installed between reactor and condenser.

In a further embodiment, THF is distilled off simultaneously with the mixture of the hydrocarbon used in the copolymerization with water; the THF can, depending on the hydrocarbon, form a tertiary azeotrope.

The hydrocarbon distilled off in a mixture with water or the mixtures of water and hydrocarbon with tetrahydrofuran can be dried by means of a suitable solid adsorbent, for example over molecular sieves, and be fed back into the copolymerization. Phase separation into an aqueous phase and the hydrocarbon is also conceivable. The aqueous phase contains up to 5% by weight of THF, preferably <1% by weight. Furthermore, the respective hydrocarbon is present in it in concentrations of <1% by weight. THF and the hydrocarbon can be recovered from the aqueous phase by distillation and be recirculated. However, the aqueous phase can also be discarded.

The copolymer solution remaining after the hydrocarbon/water mixture has been separated off is preferably passed to a phase separator. Addition of further amounts of hydrocarbon allows the heteropolyacid to be separated off from the product phase. The heteropolyacid is preferably reused for the next copolymerization. This method which is known per se, for example from EP-A 181 621, leads to precipitation of the heteropolyacid from the organic phase. As hydrocarbon, preference is given to using the hydrocarbon which has been used in the copolymerization. The heteropolyacid is preferably reused for the next copolymerization.

The process of the present invention can be carried either continuously or batchwise or as a semibatch process. A semibatch or semicontinuous mode of operation is one in which the heteropolyacid is initially charged together with 20-50% by weight of the other starting materials. The remainder of the starting materials is then metered in during the reaction time. In continuous and batch processes, the heteropolyacid is advantageously used in amounts of from 1 to 300 parts by weight, preferably from 5 to 150 parts by weight, based on 100 parts by weight of the monomers used (THF and alpha, omega-diols). It is also possible to add larger amounts of heteropolyacid to the reaction mixture.

The heteropolyacid can be introduced into the reaction in solid form, whereupon it is gradually solvated by being brought into contact with the further reactants to form the liquid catalyst phase. An alternative procedure is to slurry the solid heteropolyacid with the alpha, omega-diol and/or the THF to be used and to introduce the resulting catalyst solution into the reactor as a liquid catalyst phase. Either the catalyst phase or the monomeric starting material can be placed in the reactor first. However, it is also possible to introduce both components simultaneously into the reactor.

In a continuous mode of operation, water is metered into the reactor in an amount of from 0.1 to 5% by weight, preferably 0.1-3.5% by weight, particularly preferably 0.1-[lacuna] % by weight, based on the total amount of monomeric THF and comonomer usually via a level regulator. Fresh monomer is advantageously introduced in an amount corresponding to that in which product and unreacted monomer are discharged from the reaction apparatus. The residence time and therefore the polymerization time can also be controlled in this way, thus providing a further means of influencing and setting the mean molecular weight and the molecular weight distribution of the polymer formed.

The copolymerization can be monitored and controlled by means of an on-line conductivity measurement.

In a batch process, the copolymerization is preferably stopped in a conductivity range of 0.1-2.5 µS depending on the desired target molecular weight. To improve the stability of the organic product phase to oxidation, 10-500 ppm, particularly preferably 50-300 ppm, of a free radical scavenger can be added thereto. 250 ppm of 2,6-di-tert-butyl-4-methylcresol (BHT) are particularly suitable as free radical scavenger.

The control of the mean molecular weight via the electrical conductivity of the copolymer solution is disclosed in detail in the German patent application DE 10259036.2 dated Feb. 17, 2002 of the applicant, which is hereby expressly incorporated by reference.

In general, the copolymerization in a batch process is, depending on the amount of catalyst and the reaction temperature, carried out for a period of from 0.5 to 70 hours, preferably from 5 to 50 hours and particularly preferably from 10 to 40 hours. In a continuous process, residence times of from 1 to 50 hours, preferably from 10 to 40 hours, are usually set. At the beginning of a continuous reaction, the reaction system described takes some time until a steady-state equilibrium has been established and during this time it can be advantageous to keep the reactor outlet closed, i.e. not to discharge any product solution from the reaction apparatus.

The copolymerization is usually carried out at from 20 to 100° C., preferably from 30 to 80° C. It is advantageously carried out under atmospheric pressure, but a reaction under pressure, usually the autogenous pressure of the reaction system, can likewise prove to be useful and advantageous.

Whether the process is carried out batchwise, semicontinuously or continuously, the reactors should be equipped with effective mixing devices, for example stirrers.

Suitable reactors include all liquid reactors which are known to those skilled in the art and have an internal or/and external free surface area for the necessary evaporation of the water-containing vapor and in which sufficiently high shear forces for suspending the catalyst phase in the homogeneous monomer/polymer phase are achieved in the liquid (stirred vessels, circulation reactors, jet loops, pulsed internals). A particularly advantageous type of construction is as a jet loop, since the necessary heating of the reactor can be integrated into the liquid circuit in a simple fashion. The water/hydrocarbon mixture is vaporized continuously or batchwise from the reaction mixture and the water content of the contents of the reactor is thus set to values which are advantageous for the reaction.

The process of the present invention is advantageously carried out under an inert gas atmosphere. Any inert gases such as nitrogen or argon can be used for this purpose. The reactants are likewise freed of any water and peroxides present therein before use.

The reaction can be carried out in conventional reactors or reactor assemblies which are suitable for continuous processes; for example in tube reactors fitted with internals which ensure good mixing of the emulsion-like copolymerization mixture or else in cascades of stirred vessels.

For the present purposes, an emulsion-like copolymerization mixture is a mixture containing from 2 to 10 mol of water per mole of heteropolyacid.

The process of the present invention enables polyoxyalkylene glycols, in particular copolymers of THF and neopentyl glycol, to be obtained economically, without loss of catalyst activity and in good yield, selectively and with a narrow molecular weight distribution and also in pure form with a low color number. The copolymers have degrees of incorporation of the alpha, omega-diol comonomer of from 5 to 50% by weight, based on the copolymer, and mean molecular weights $M_n$ of from 600 to 6000. The polyoxyalkylene glycols which can be prepared according to the present invention are used, for example, for producing special polyurethanes which are suitable as high-elasticity composite materials. A polyurethane polymer derived from the copolymers which can be prepared according to the present invention has a high elongation to break, a low stress change during elongation, a small hysteresis loss on stretching and recovery and a high elasticity even at very low temperatures.

EXAMPLES

Determination of the OH Number

The hydroxyl number is reported as the amount of potassium hydroxide in mg which is equivalent to the amount of acidic acid bound in the acetylation of 1 g of substance.

The hydroxyl number is determined by esterification of the hydroxyl groups present with an excess of acetic anhydride. After the reaction, the excess acetic anhydride is hydrolyzed with water and backtitrated as acetic acid with sodium hydroxide.

Determination of the Organically Bound Nitrogen

The determination of the organically bound nitrogen was carried out by the method described by Fr. Ehrenberger, Quantitative Organische Elementaranalyse, Verlag Chemie, 1991, pages 382-384, using an ANTEK 9000 vertical N-analyzer from ANTEK.

Example 1

In a 10 l double-walled reactor provided with a magnetic stirrer and superposed countercurrent rectification column (30 theoretical plates), a mixture of 5047 g of THF and 266 g of technical-grade neopentyl glycol was stirred to give a homogeneous solution. While stirring, 4125 g of a dodecaphosphotungsten acid ($H_3PO_4*xH_2O$ where x=4-7) were added thereto. The emulsion obtained was stirred at 95° C. for 5 hours. 200 g/h of a mixture of neopentyl glycol/THF/n-pentane consisting of 5 parts of commercial NPG (organic nitrogen content: 15 ppm), 2 parts of pentane and THF as balance were subsequently fed continuously via a prereactor charged with a cation exchanger (Lewatit® S100 from Bayer AG, Leverkusen) into the reaction vessel. After passage through the prereactor, the NPG still had, after removal of volatile components, a content of <1 ppm of organically bound nitrogen. The reaction temperature was maintained at 66-67° C. The THF/pentane/water mixture which vaporized was condensed. Water obtained was discharged after phase separation.

The output obtained continuously from the polymerization reactor was admixed with 250 g of pentane and subjected to phase separation. The heavy catalyst phase was recirculated to the polymerization reactor. The upper phase was passed at 20° C. over a combination of cation and anion exchangers which were each arranged as a fixed bed.

THF was evaporated in a single stage at 1.0 bar and 75° C. from the reactor output which had been freed of traces of acid in this way and was recirculated to the reaction. At 15 mbar and 170° C., the unreacted NPG was then likewise evaporated in a single stage and recirculated to the reaction.

The copolymer conversion determined by sampling was about 37% at the beginning of the experiment. The catalyst suffered only insignificant deactivation over a time of 2000 hours. After 2000 hours of operation, the mean polymerization conversion was 36%. This corresponds to a mean deactivation of 0.012%/day.

A copolymer having a mean OH number of 58 mg KOH/g was obtained.

Comparative Example 2

The procedure of example 1 was repeated using commercial, technical-grade NPG (content of organically bound nitrogen: 15 ppm), but the prereactor charged with ion exchanger was removed.

The copolymer conversion determined by sampling was 37% at the beginning of the experiment. The catalyst suffered severe deactivation over a time of 2000 hours. After 2000 hours of operation, the mean polymerization conversion was 30.6%. This corresponds to a mean deactivation of about 0.08%/day.

We claim:

1. A process for the single-stage preparation of polyoxyalkylene glycols comprising copolymerization of THF and neopentyl glycol in the presence of a heteropolyacid, wherein the content of organically bound nitrogen in the neopentyl glycol is less than 5 ppm.

2. The process for the single-stage preparation of polyoxyalkylene glycols according to claim 1 wherein the content of organically bound nitrogen in the neopentyl glycol is achieved by treatment of technical-grade neopentyl glycol by recrystallization, solvent extraction or by treatment with an ion exchanger.

3. The process for the single-stage preparation of polyoxyalkylene glycols according to claim 1 wherein from 3 to 20% by weight of neopentyl glycol, based on tetrahydrofuran, is used.

4. The process for the single-stage preparation of polyoxyalkylene glycols according to claim 1 wherein the copolymerization is carried out in the presence of a hydrocarbon.

5. The process for the single-stage preparation of polyoxyalkylene glycols according to claim 1 wherein the process is carried out continuously.

6. The process for the single-stage preparation of polyoxyalkylene glycols according to claim 1 wherein the copolymerization is carried out at from 20 to 100° C.

7. The process for the single-stage preparation of polyoxyalkylene glycols according to claim 2 wherein from 3 to 20% by weight of neopentyl glycol, based on tetrahydrofuran, is used.

8. The process for the single-stage preparation of polyoxyalkylene glycols according to claim 2 wherein the copolymerization is carried out in the presence of a hydrocarbon.

9. The process for the single-stage preparation of polyoxyalkylene glycols according to claim 3 wherein the copolymerization is carried out in the presence of a hydrocarbon.

10. The process for the single-stage preparation of polyoxyalkylene glycols according to claim 2 wherein the process is carried out continuously.

11. The process for the single-stage preparation of polyoxyalkylene glycols according to claim 3 wherein the process is carried out continuously.

12. The process for the single-stage preparation of polyoxyalkylene glycols according to claim 4 wherein the process is carried out continuously.

13. The process for the single-stage preparation of polyoxyalkylene glycols according to claim 2 wherein the copolymerization is carried out at from 20 to 100° C.

14. The process for the single-stage preparation of polyoxyalkylene glycols according to claim 3 wherein the copolymerization is carried out at from 20 to 100° C.

15. The process for the single-stage preparation of polyoxyalkylene glycols according to claim 4 wherein the copolymerization is carried out at from 20 to 100° C.

16. The process for the single-stage preparation of polyoxyalkylene glycols according to claim 5 wherein the copolymerization is carried out at from 20 to 100° C.

\* \* \* \* \*